(12) United States Patent
Leveque et al.

(10) Patent No.: US 7,526,862 B2
(45) Date of Patent: May 5, 2009

(54) METHOD OF MANUFACTURING A HOLLOW BLADE FOR A TURBOMACHINE

(75) Inventors: Stéphane André Leveque, Massy (FR); Daniel Gaston Lhomme, Bessancourt (FR); Alain Lorieux, Sannois (FR)

(73) Assignee: Snecma, Paris (FR)

( * ) Notice: Subject to any disclaimer, the term of this patent is extended or adjusted under 35 U.S.C. 154(b) by 766 days.

(21) Appl. No.: 11/068,749

(22) Filed: Mar. 2, 2005

(65) Prior Publication Data

US 2005/0246895 A1    Nov. 10, 2005

(30) Foreign Application Priority Data

Mar. 3, 2004    (FR) .................................... 04 50431

(51) Int. Cl.
*B21D 22/00* (2006.01)
*B23K 31/00* (2006.01)
*B23P 15/02* (2006.01)
*B23P 17/00* (2006.01)
*B64C 11/04* (2006.01)

(52) U.S. Cl. ...................... 29/889.7; 29/889.72; 29/421; 72/352; 72/353.2; 72/353.6; 72/354.2; 72/360; 416/212 R; 228/136; 228/164

(58) Field of Classification Search ................. 29/889.7, 29/889.72, 421; 72/352, 353.2, 353.6, 354.2, 72/360; 416/212 R; 228/136, 164, 193
See application file for complete search history.

(56) References Cited

U.S. PATENT DOCUMENTS

| | | | |
|---|---|---|---|
| 3,228,095 A * | 1/1966 | Bird et al. .................... 29/889.7 |
| 5,636,440 A | 6/1997 | Bichon et al. |
| 5,896,658 A * | 4/1999 | Calle et al. ............... 29/889.72 |
| 6,418,619 B1 * | 7/2002 | Launders .................... 29/889.7 |
| 6,467,168 B2 | 10/2002 | Wallis |
| 6,705,011 B1 | 3/2004 | Leibfried et al. |
| 2002/0090302 A1 | 7/2002 | Norris et al. |

FOREIGN PATENT DOCUMENTS

EP    1 338 353 A1    8/2003

* cited by examiner

*Primary Examiner*—Jermie E Cozart
*Assistant Examiner*—Alexander P Taousakis
(74) *Attorney, Agent, or Firm*—Oblon, Spivak, McClelland, Maier & Neustadt, P.C.

(57) ABSTRACT

Method of manufacturing a hollow blade (1) for a turbomachine in which the blade (1) is made from a preform (14) obtained from external primary parts (28, 30). In order to reduce costs, the root part (2) of the blade is formed from spare material (34) entirely located on only one of the two external primary parts of the preform (14).

21 Claims, 3 Drawing Sheets

METHOD OF MANUFACTURING A HOLLOW BLADE FOR A TURBOMACHINE

TECHNICAL DOMAIN AND STATE OF THE ART

This invention relates to methods of manufacturing blades for turbomachines in general, such as hollow fan blades, or any other type of rotor or stator blades for turbomachines.

Normally, a hollow fan blade for a turbomachine includes a relatively thick root used to fix this blade in a rotor disk, this root extending outwards in the radial direction in a thin aerodynamic part called the tip of the blade.

A method of manufacturing such a hollow blade is known in prior art (see for example U.S. Pat. No. 5,636,440) based mainly on the diffusion bonding technique combined with the superplastic forming technique. In this method according to prior art, two or three constituent parts of the blade are defined at first, and then made separately before being superposed and assembled together using the diffusion bonding technique so as to obtain a preform of the desired blade.

The next step is to aerodynamically profile the previously made preform, which is then inflated by gas pressure and which undergoes a superplastic forming in order to make a blade with approximately its final shape.

As mentioned above, at least two external parts are necessary to make the blade preform. External parts are typically made by machining of supplied elements. Since each of the two machined external parts must have two radially opposite portions with very different thicknesses, these two portions from which the external part is made are called the root part and the tip part respectively, and the procured elements necessarily have relatively large initial dimensions.

One approach is to use thick plates from which primary parts are taken, for example by machining. However, thick plates have a coarse microstructure.

Another approach for improving the blade microstucture is to take primary parts from thin plates, bonding them together to form assemblies of two or three plates, and then folding over to form the root part. However, this option is limited by the hot buckling criterion; the thickness of the preform must be greater than one third of the length necessary to produce the root. Therefore the geometry of the blade root cannot need a very large volume of material.

Thus, manufacturing of external parts that will at least partially form the blade preform, for example made by rolling, involves extremely high material and machining costs, such that the method of manufacturing the hollow blade is not fully optimized.

PRESENTATION OF THE INVENTION

The purpose of the invention is to propose a method of manufacturing a hollow blade for a turbomachine, that at least partially overcomes the disadvantages mentioned above.

More precisely, according to one of its aspects, the invention relates to a method of manufacturing a hollow blade in which the fabrication costs of the step to make external parts of the blade preform are significantly lower than in prior art.

In particular, one of the primary external parts only has a complex shape; the root part of the preform, the future blade root, is formed entirely from this first primary part, that therefore contains sufficient spare material at one of its ends to make the complete root part, in other words all of the part projecting beyond the prolongation of the tip part. Therefore there is a partial transfer of material towards the other side of the blade center line. This primary part is preferably forged.

Advantageously, another external primary part can be substantially in the shape of a piece of sheet metal that is a simple element easy to machine at a reasonable cost. A third primary part can also be machined so as to form a central support element or stiffener in the preform.

Advantageously, diffusion bonding of the preform is followed by superplastic forming so as to make the blade itself. Superplastic forming can be preceded by aerodynamic profiling of the preform and inflation by gas pressure.

The method according to the invention preferably includes a step to tip over the spare material located on the first external primary part so as to form a symmetrical root part. This step can be done by forging, preferably hot forging. Tipping can be done after by diffusion bonding, for example during aerodynamic profiling of the preform.

BRIEF DESCRIPTION OF THE FIGURES

The specific features and advantages of the invention will be better understood after reading the following description with reference to the appended figures, given for illustrative purposes only and in no way limitative, wherein.

DETAILED PRESENTATION OF PARTICULAR EMBODIMENTS

Figure 1:
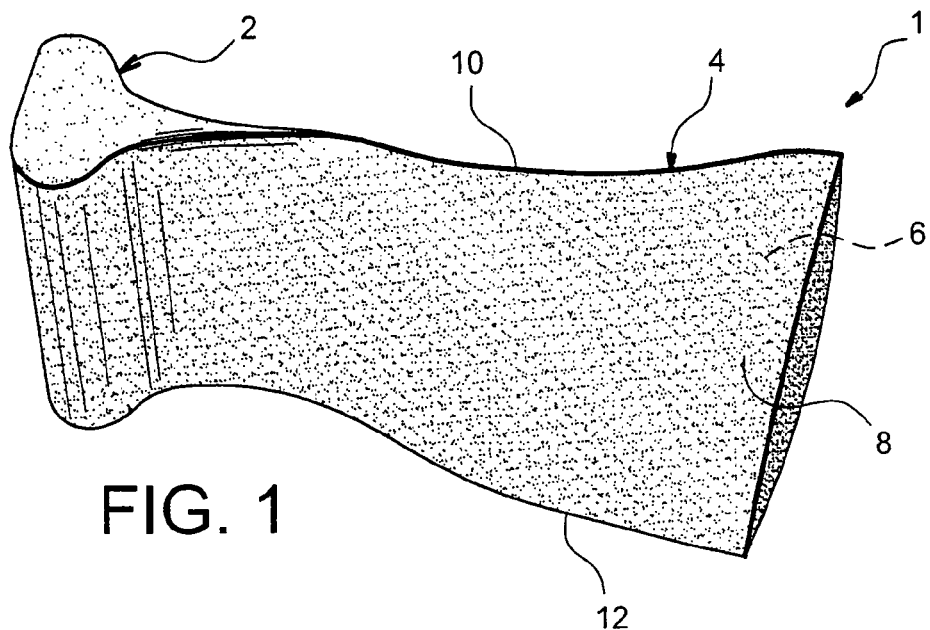
FIG. 1 shows a conventional hollow blade for a turbomachine.

FIG. 1 shows a hollow blade 1 of the fan rotor blade type with a large chord for turbomachine (not shown). This type of blade with a complex geometry, for example made of titanium or a titanium alloy such as TiAlV, comprises a root 2 extended by a tip 4 in the radial direction. The tip 4, designed to be placed in the circulation annulus of a turbomachine air stream, has two external surfaces, called the suction surface 6 and the pressure surface 8 respectively, connected by a leading edge 10 and a trailing edge 12.

The SPF/DB (Super Plastic Forming/Diffusion Bonding) process is used in preference to make such a complex profile.

Figure 2:
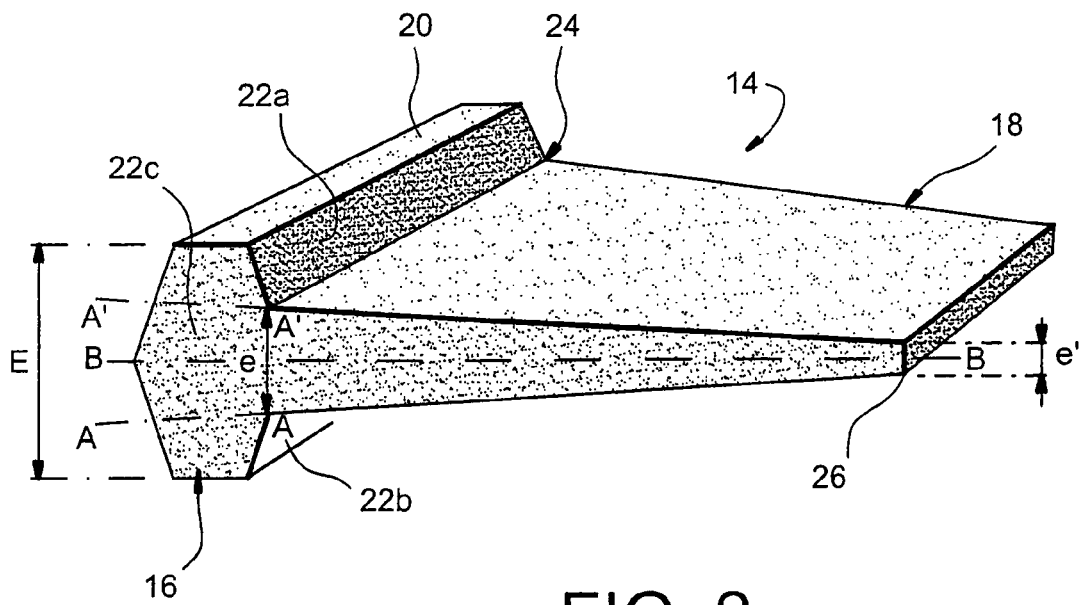
FIG. 2 shows a blade preform as obtained after diffusion bonding or as modeled to define primary parts.

Regardless of what process is used, the first step consists of modeling the profile of the blade 1 so as to obtain a preform that can be made by bonding primary parts; the pressure surface 6 and the suction surface 8, or the graphic representation of them, are placed on the same plane. This operation can be done by simulation using CAD (Computer Aided Design) means, for example by deflation followed by twisting and "straightening" to obtain a preform like that shown on FIG. 2.

This preform 14 comprises a root part 16 that is prolonged in a radial direction by a tip part 18. As can be seen on this FIG. 2, the root part 16 is provided with a portion 20 with a high average thickness E that projects from each side of the surfaces defined by the faces of the tip part 18 and the prolongations thereof, also called the AA planes of the preform 14. Note for information that the projecting portion 20 will subsequently be used for attachment of the blade into a turbine rotor disk, particularly due to two projection parts 22a and 22b located on each side of a central part 22c arranged along the prolongation of the tip portion 18.

The tip part 18 of the preform 14 has a radially internal end 24 with a thickness e and a radially external end 26 with a thickness e' usually thinner than the thickness e. However, the thickness of the tip part 18 of the preform 14 does not vary greatly, the difference between e and e' being exaggerated on FIG. 2.

Primary parts are defined to enable manufacturing of the preform 14 (which, for a hollow blade 1, should be "inflatable" and therefore can not be made of a single piece), and will be fixed together. The primary parts can be defined in different ways, the most obvious being a longitudinal section along the central plane BB, as described in document U.S. Pat. No. 5,636,440. However, this option has the main disadvantage that at least two parts with a complex profile have to be machined, one including a part 22a and the other a part 22b of the root 16.

Figure 3:
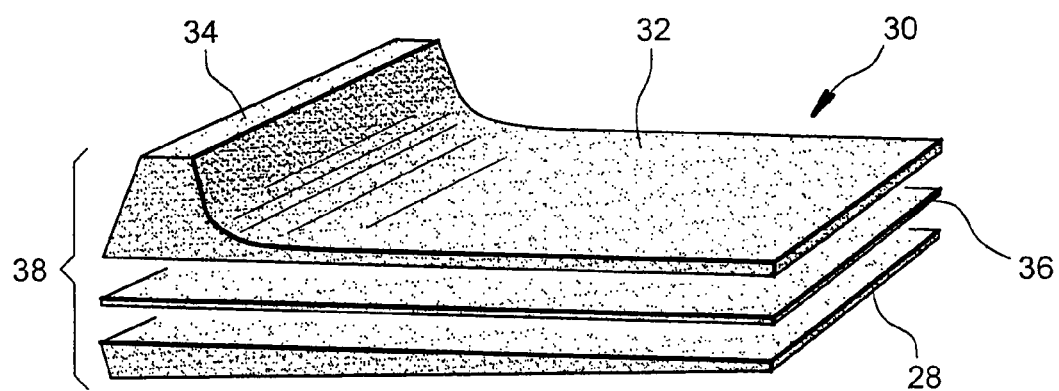
FIG. 3 shows a diagrammatic perspective view of all component parts of the preform.

Within the context of the invention, only one primary part may have a complex profile, and the material necessary for formation of the root part 16 being tipped over is located on only one side of the planes AA of the preform 14, which prolongates the external surface of the tip. Thus, two external primary parts are obtained as shown on FIG. 3; the first primary part 30 has a tip part 32 more or less in the form of a plate with spare material 34 at one of its ends; the second external primary part 28 is more or less in the form of a plate. The first and second external primary parts 28, 30 may be used for the pressure surface 6 or the suction surface 8 indifferently.

Depending on the dimensions of the blade, the stresses that will be applied to it, etc., a third primary part 36 may be defined that will act as a stiffener to the preform by being inserted between the two external parts 28, 30. This support part 36 is also more or less in the form of a plate.

A part more or less in the form of a plate means a part that is thin by comparison with its length and its width, and with an approximately uniform thickness, advantageously of the order of 2 to 8 mm, and preferably 5 mm. The rolling production technique is particularly suitable for these parts 28, 36 and is optimized in terms of material and machining costs, provided that the element supplied for its fabrication can be easily made with dimensions approximately equal to the final dimensions of these parts.

The first primary part 30 may also be made from a plate, preferably with a thickness gradient or a forged part, or any other supplied shape with the required characteristics. Any technique known to those skilled in the art could be used to machine the part itself. However, in order to optimize the properties and the microstructure of the blade, a forged supply enabling manufacturing of a primary part 30 with remarkable microstructural properties will be preferred.

Once made, the external primary parts 28, 30 are assembled into a blank 38 and fixed together, possibly with a primary support part 36 designed to stiffen the hollow structure. The parts are advantageously fixed together by diffusion bonding.

Figure 4:
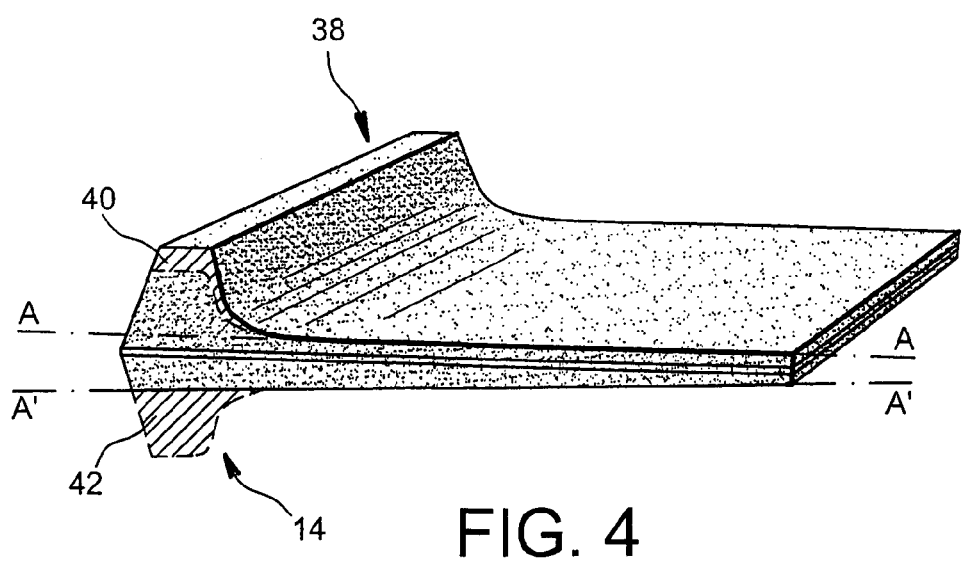
FIG. 4 shows a diagrammatic view of the operation to tip over the spare material.

After bonding, the spare material 34 is located on only one side of the blank 38, which is sensibly plane elsewhere. The spare material 34 is then partially transferred to the other side of the second external primary part 28 so as to distribute the mass of the root 2 of the blade 1 on each side of the blade 6 (i.e. the mass of the root part 16 of the preform 14 on each side of the tip part 18); thus, FIG. 4 shows the transfer of surplus material 40 from one side of plane AA of the blank 38 to the other side, to form a projection of the tipped material 42 that will form an integral part of the root part 16 of the preform 14 and the blade 1.

According to one preferred embodiment, the <<tipping>> is advantageously done by forging, preferably hot on a press, by hot forming, for example at between 850 and 950° C., particularly on any known <<press>> type forging means.

Figure 5A:
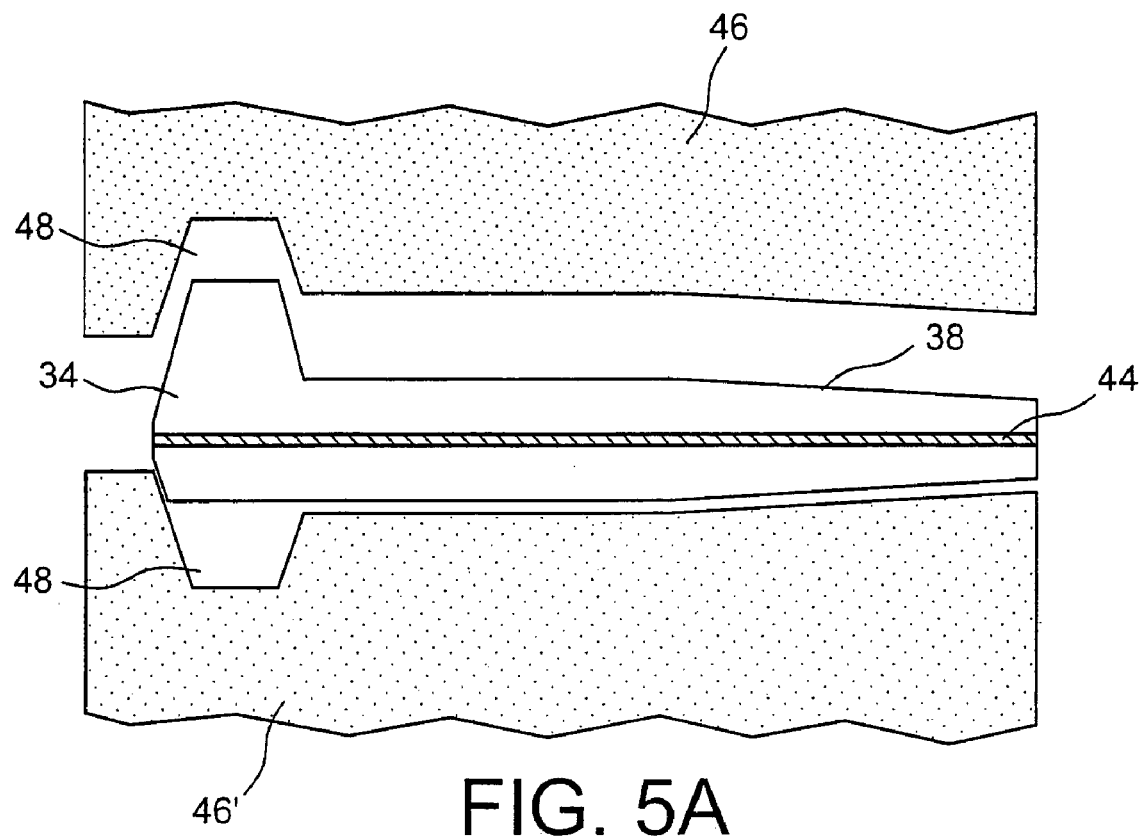
FIGS. 5A and 5B show tipping by forging according to one embodiment of the invention.
Figure 5B:
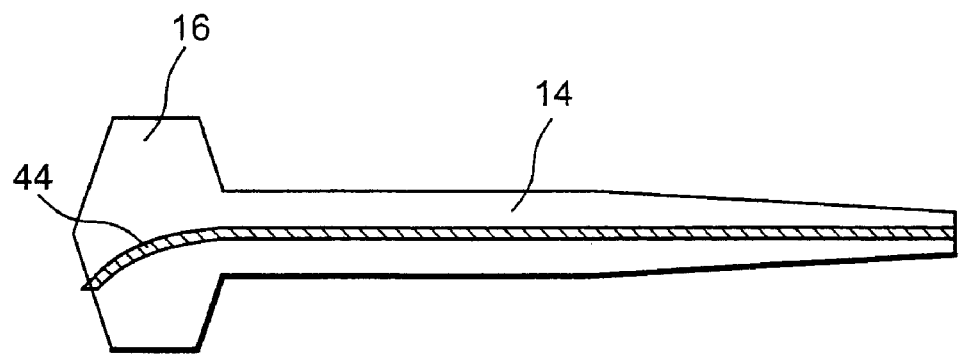

An example is shown diagrammatically on FIG. 5. A blank 38, derived from bonding of primary parts 28, 30 (see FIG. 3) and asymmetric but with a joint plane 44, is inserted in a press comprising two advantageously heated dies 46, 46'. Each die is provided with a <<Turkish hat>> shaped recess 48, 48' which facilitates correct positioning of the blank 38, also advantageously heated. Preferably, the dies 46 are closed in a manner chosen to encourage soft fibering of the material. At the end of the process, the material 40, initially above the upper recess 48, fills in the lower recess 48'. Unlike the diagram shown in FIG. 4, and as illustrated in FIG. 5B, it can be seen that the joint plane 44 has also been displaced.

At the same time as the material is tipped over, or after it is tipped over, the preform 14 is advantageously aerodynamically profiled.

The preform, possibly with its aerodynamic profile, is then machined to make a blade 1. This step is preferably performed by applying gas pressure and superplastic forming in accordance with conditions known in the SPF/DB technique.

Therefore, with the method according to the invention, it is possible to make a blade and a blade preform starting from simple elements such as plates, for at least one of the two outer parts and possibly a central part, and only one complex supplied element including spare material for the blade root; note that manufacturing of this type of complex part accounts for more than 40% of the cost of a blade. Consequently, the manufacturing cost is significantly reduced; material losses and difficult machining only occur for one part.

The invention claimed is:

1. A method for manufacturing a blade for a turbomachine, the method comprising:
   a step for making a first external primary part comprising a tip part and spare material projecting at one of its ends beyond the prolongation of the tip part;
   a step for making a second external primary part; and
   a diffusion bonding step of the two external primary parts to make a blade preform, the blade preform having a tip part and a root part, a projecting spare material being sufficient to make the complete root part of the preform from the projecting spare material, the root part including:

a first projection part surface on a side of the preform associated with a suction surface of the preform, and a second projection part surface on a side of the preform associated with a pressure surface of the preform, wherein the first and second projection part surfaces configured to interface with a turbine rotor disk.

2. The method according to claim 1, in which the step for making the first external primary part includes forging of a supplied element.

3. The method according to claim 1, including a step for partially tipping the spare material after diffusion bonding of the two external primary parts so as to form the root part of the blade preform.

4. The method according to claim 3, in which a hot forming operation is utilized for partially tipping the spare material.

5. The method according to claim 1, in which the step to diffusion bond two external parts is followed by a step inflating the preform with gas pressure and superplastic forming of the blade preform.

6. The method according to claim 1, including making the second external primary part substantially in the shape of a sheet metal.

7. A method for manufacturing a blade for a turbomachine, said method comprising:

a step for forging a supplied element so as to make a first external primary part comprising a tip part and a spare material projecting at one of its ends beyond the prolongation of the tip part;

a step for making a second external primary part;

a diffusion bonding step of the two external primary parts to make a blade preform, the blade preform having a tip part and a root part, the spare material being sufficient to make the complete root part of the blade preform from the projecting spare material, the root part including:

a first projection part surface on a side of the blade preform associated with a suction surface of the blade preform, and a second projection part surface on a side of the blade preform associated with a pressure surface of the blade preform, wherein the first and second projection part surfaces adapted to interface with a turbine rotor disk;

a step for partially tipping the spare material on the other side of a first geometric plane corresponding to bonding of the blade preform so as to form the root part of the blade preform.

8. The method according to claim 7, in which a forging operation is utilized for partially tipping the spare material.

9. The method according to claim 8, performing a hot forming operation between 850 and 950° C. for partially tipping the spare material of the blade preform to form the root part.

10. The method according to claim 7, in which the step to diffusion bond two external parts is followed by a step inflating the preform with gas pressure and superplastic forming of the blade preform.

11. The method according to claim 10, in which the inflation with gas pressure is preceded by an aerodynamic profiling of the blade preform.

12. A method according to claim 7, including the manufacture of a third primary support part, and the blade preform being composed of two external primary parts surrounding the primary support part.

13. A method for manufacturing a blade for a turbomachine, said method comprising:

forging a supplied element so as to make a first external primary part, the first primary part includes:

a first bonding surface configured substantially in a first geometric plane;

a first tip part having the first bonding surface and a top external surface, the top external surface configured opposite the first bonding surface and the top external surface configured substantially according to a second geometric plane; and a first root part disposed at a distal end of the first external primary part, said first root part configured on both sides of the second geometric plane, said first root part having a spare material on a side of the second geometric plane opposite the first tip part, said first root part disposed on a side of the first bonding surface;

making a second external primary part;

diffusion bonding the two external primary parts to make a blade preform;

aerodynamically profiling the blade preform and performing a partial tipping operation on the blade preform, the resulting blade preform having a rotor disk interface with a first projection part surface and a second projection part surface, and the first and second projection part surfaces configured to interface with a turbine rotor disk.

14. The method according to claim 13, the making of a second external primary part wherein said second external primary part includes:

a second tip bonding surface configured substantially within a third geometric plane, a second tip part having a bottom external surface, said bottom external surface configured opposite the first portion of the second bonding surface, the bottom external surface configured substantially within a fourth geometric plane, said second external primary part configured substantially on a single side of the fourth geometric plane, and a second root part disposed at a distal end of the second external primary part.

15. The method according to claim 14, wherein after diffusion bonding of the two external primary parts, the first and second bonding surfaces face each other, the first and second tip parts bond to make a tip part preform, the first and second root parts bond to make a root part preform, and the spare material sufficient to comprise a portion of the root part preform remains disposed opposite to the single side of the fourth geometric plane.

16. The method according to claim 15, wherein during the aerodynamically profiling the tip part preform, the tip part preform acquires a final aerodynamic profile of the blade including a leading edge, a trailing edge, a pressure surface, and a suction surface, and during the partial tipping operation, the root part preform is partially tipped such that the spare material moves from the side of the second geometric plane opposite the first tip part to the first tip side of the second geometric plane, and a quantity of preform material equivalent to the spare material moves from the single side of the fourth geometric plane to the opposite side of said fourth geometric plane to form a root part, the root part after the partial tipping projects beyond both the second and fourth geometric planes, and said second and fourth geometric planes are established for the root part preform prior to the aerodynamic profiling step.

17. The method according to claim 16, wherein inflating the blade part preform with gas pressure and superplastic forming the blade part preform follows the aerodynamically profiling and partial tipping operations.

18. The method according to claim 17, wherein the second external primary part is made substantially in the shape of sheet metal.

19. The method according to claim 18, comprising:

making a third primary support part;

diffusion bonding the first and second external primary parts with the primary support part to make the blade preform having the first and second external primary parts surround the primary support part, wherein the first and second bonding surfaces face the primary support part, the primary support part includes a tip part support portion and a root part support portion, the first and second tip parts bond with the tip part support portion to make the tip part preform, and the first and second root parts bond with the root part support portion to make the root part preform.

20. A method for manufacturing a blade for a turbomachine, said method comprising:

making a first external primary part comprising a tip part and spare material projecting at one of its ends beyond the prolongation of the tip part;

making a second external primary part substantially in the shape of a sheet metal;

a diffusion bonding step of the two external primary parts to make a blade preform, the blade preform having a tip part and a root part, the tip part having a suction side and a pressure side, a projecting spare material being sufficient to make the complete root part of the preform from the projecting spare material; and partially tipping the spare material so as to form the root part of the blade preform projecting beyond each of the two suction and pressure sides of the tip part of the blade preform.

21. A method according to claim 20, including the manufacture of a third primary support part, and the blade preform being composed of two external primary parts surrounding the primary support part.

* * * * *

UNITED STATES PATENT AND TRADEMARK OFFICE
CERTIFICATE OF CORRECTION

PATENT NO. : 7,526,862 B2  Page 1 of 1
APPLICATION NO. : 11/068749
DATED : May 5, 2009
INVENTOR(S) : Stephane A. Leveque et al.

It is certified that error appears in the above-identified patent and that said Letters Patent is hereby corrected as shown below:

Column 5, line 6, insert --are-- before "configured"
         line 41, insert --are-- before "adapted"

Column 6, line 22, claim 13 insert --being-- before "configured"

Signed and Sealed this

Twenty-fifth Day of August, 2009

David J. Kappos
*Director of the United States Patent and Trademark Office*